United States Patent [19]

Torchio

[11] Patent Number: 5,148,767
[45] Date of Patent: Sep. 22, 1992

[54] WINDOW MOUNTED PET ENCLOSURE

[76] Inventor: John A. Torchio, 31 Newell St., Pittsfield, Mass. 01201

[21] Appl. No.: 824,347

[22] Filed: Jan. 23, 1992

[51] Int. Cl.$^5$ ............................................... A01K 1/00
[52] U.S. Cl. .......................................... 119/19; 119/15
[58] Field of Search ...................... 119/15, 19, 17, 285; 47/40

[56] References Cited

U.S. PATENT DOCUMENTS

| | | | |
|---|---|---|---|
| 1,575,683 | 3/1926 | Groves et al. | 47/40 |
| 4,023,306 | 5/1977 | Ruggieri | 47/40 |
| 4,445,459 | 5/1984 | Julie | 47/40 |
| 5,016,571 | 5/1991 | Totaro | 119/23 |

FOREIGN PATENT DOCUMENTS

| | | | |
|---|---|---|---|
| 1235479 | 6/1986 | U.S.S.R. | 119/15 |
| 719755 | 12/1954 | United Kingdom | 119/15 |

Primary Examiner—John G. Weiss

[57] ABSTRACT

An enclosure is arranged for mounting within a framework of an associated window to permit a pet to be received within the enclosure to permit access to fresh air when the pet is maintained within an interior environment in a dwelling. The enclosure is arranged to be formed with spaced side walls and an end wall, with each of the walls having a screen member mounted therewithin. The invention in modified form may include window plates pivotally mounted above each screen member and may be further provided with a heating assembly to provide heating within the enclosure during periods of depressed temperature conditions.

1 Claim, 4 Drawing Sheets

WINDOW MOUNTED PET ENCLOSURE

BACKGROUND OF THE INVENTION

1. Field of the Invention

The field of invention relates to pet apparatus, and more particularly pertains to a new and improved window mounted pet enclosure wherein the same permits access of a pet to ventilation from within an interior dwelling.

2. Description of the Prior Art

Pets that are typically secured within a dwelling, particularly during the daylight hours when owners are at work or away from the dwelling for various reasons, prevents an animal from access to exterior air. Various other window mounted structure is available in the prior art and such structure is typically directed to plants and the like and as such does not accommodate the needs of a pet owner in this regard. Such plant enclosure structure is exemplified by the U.S. Pat. No. 3,800,470 to Kleine; U.S. Pat. No. 4,897,958 to Brydges; U.S. Pat. No. 4,748,770 to Cline; and U.S. Pat. No. 3,946,522 to Schifman.

Accordingly, it may be appreciated that there continues to be a need for a new and improved window mounted pet enclosure as set forth by the instant invention which addresses both the problems of ease of use as well as effectiveness in construction wherein the same is arranged for accommodation of a pet for access to ventilation from within a dwelling and in this respect, the present invention substantially fulfills this need.

SUMMARY OF THE INVENTION

In view of the foregoing disadvantages inherent in the known types of pet apparatus now present in the prior art, the present invention provides a window mounted pet enclosure wherein the same is arranged to receive a pet from within a dwelling with the enclosure mounted to an associated window framework extending exteriorly of the associated dwelling. As such, the general purpose of the present invention, which will be described subsequently in greater detail, is to provide a new and improved window mounted pet enclosure which has all the advantages of the prior art pet apparatus and none of the disadvantages.

To attain this, the present invention provides an enclosure arranged for mounting within a framework of an associated window to permit a pet to be received within the enclosure to permit access to fresh air when the pet is maintained within an interior environment in a dwelling. The enclosure is arranged to be formed with spaced side walls and an end wall, with each of the walls having a screen member mounted therewithin. The invention in modified form may include window plates pivotally mounted above each screen member and may be further provided with a heating assembly to provide heating within the enclosure during periods of depressed temperature conditions.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved window mounted pet enclosure which has all the advantages of the prior art pet apparatus and none of the disadvantages.

It is another object of the present invention to provide a new and improved window mounted pet enclosure which may be easily and efficiently manufactured and marketed.

It is a further object of the present invention to provide a new and improved window mounted pet enclosure which is of a durable and reliable construction.

An even further object of the present invention is to provide a new and improved window mounted pet enclosure which is susceptible of a low cost of manufacture with regard to both materials and labor, and which accordingly is then susceptible of low prices of sale to the consuming public, thereby making such window mounted pet enclosure economically available to the buying public.

Still yet another object of the present invention is to provide a new and improved window mounted pet enclosure which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
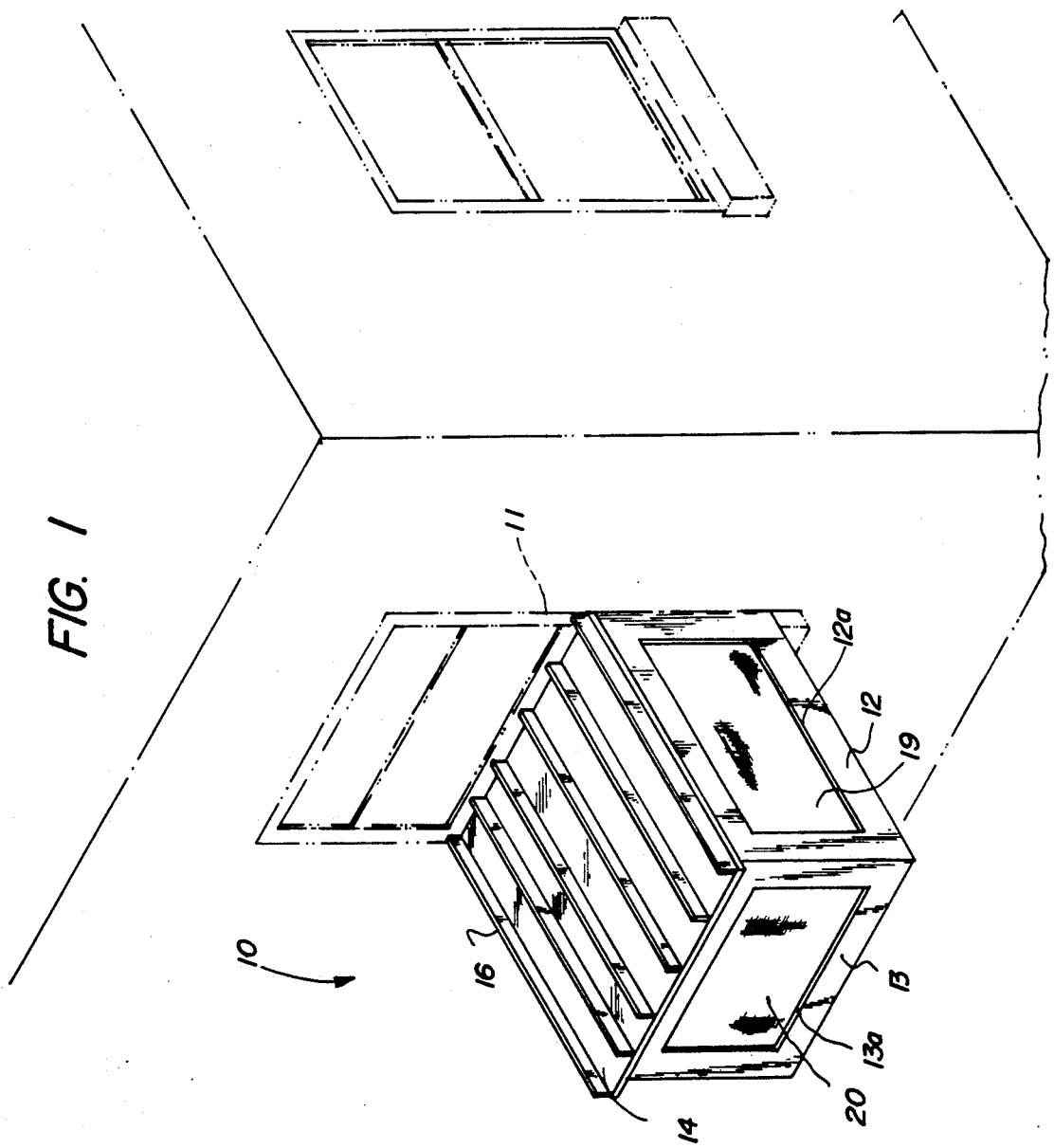
FIG. 1 is an isometric illustration of the invention mounted to a window framework.
Figure 2:
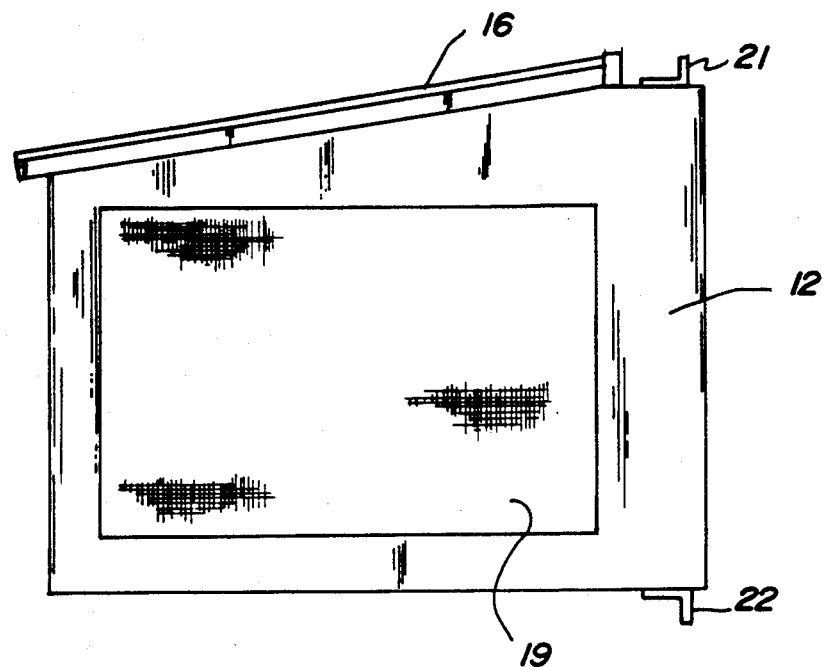
FIG. 2 is an orthographic side view of the instant invention.
Figure 3:
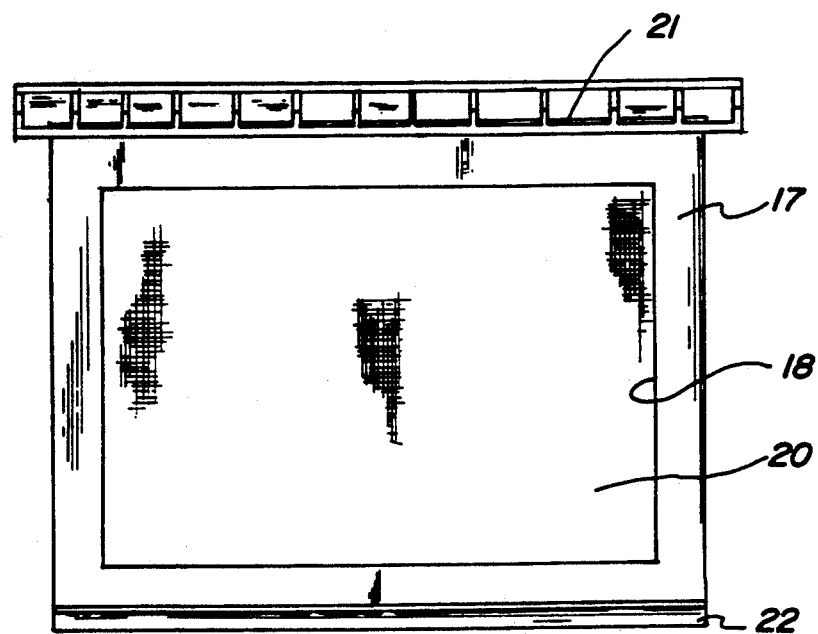
FIG. 3 is an orthographic frontal view, taken in elevation, of the invention.

With reference now to the drawings, and in particular to FIGS. 1 to 6 thereof, a new and improved window mounted pet enclosure embodying the principles and concepts of the present invention and generally designated by the reference numerals 10 and 10a will be described.

More specifically, the window mounted pet enclosure 10 of the instant invention essentially comprises a window frame 11 to receive the enclosure therewithin. The enclosure includes spaced side walls 12, with each side wall including a side wall opening 12a. An end wall 13 extends between rear distal ends of the side walls 12, with the end wall 13 including an end wall opening 13a. A top wall 14 is positioned above a floor 15. Strengthening and water guidance strips 16 are orthogonally mounted projecting upwardly of the top wall 14, wherein the ribs are in a parallel relationship relative to one another, and wherein the top wall 14 is canted downwardly from the enclosure front wall 17 towards the enclosure end wall 13. The front wall further includes a front wall opening 18 directed through the window 11 to permit a pet access into the enclosure for use. The side walls include side wall screen mesh 19 positioned therewithin, wherein the end wall includes an end wall screen mesh 20 positioned therewithin to prevent insects and the like from being directed interiorly of the enclosure, as well as maintaining the associated pet within the enclosure during use. A top wall flange 21 extending orthogonally relative to the top wall and a floor flange 22 extending downwardly relative to the floor in an orthogonal orientation are arranged wherein the flanges 21 and 22 are coplanar relative to one another to be received within parallel bars of the window frame 11 to secure the enclosure relative to the window frame.

Figure 4:
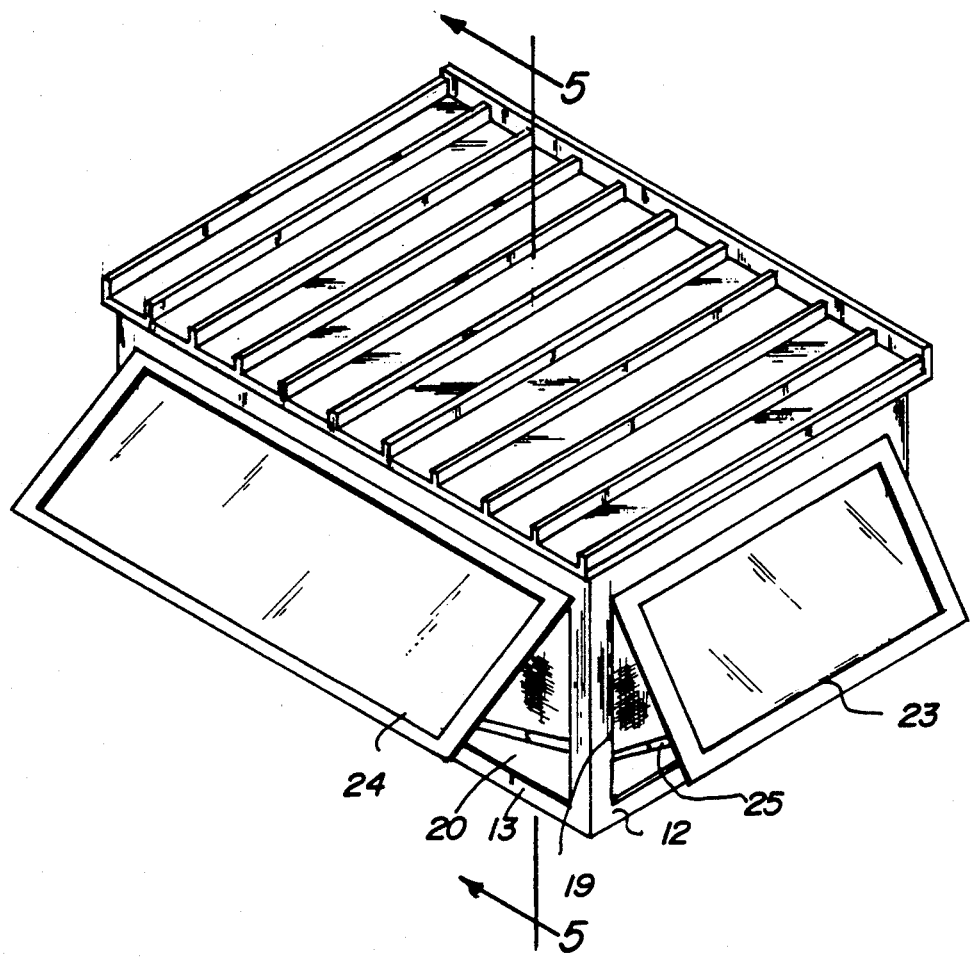
FIG. 4 is an isometric illustration of the invention utilizing window plates pivotally mounted over each screen portion of the invention.
Figure 5:
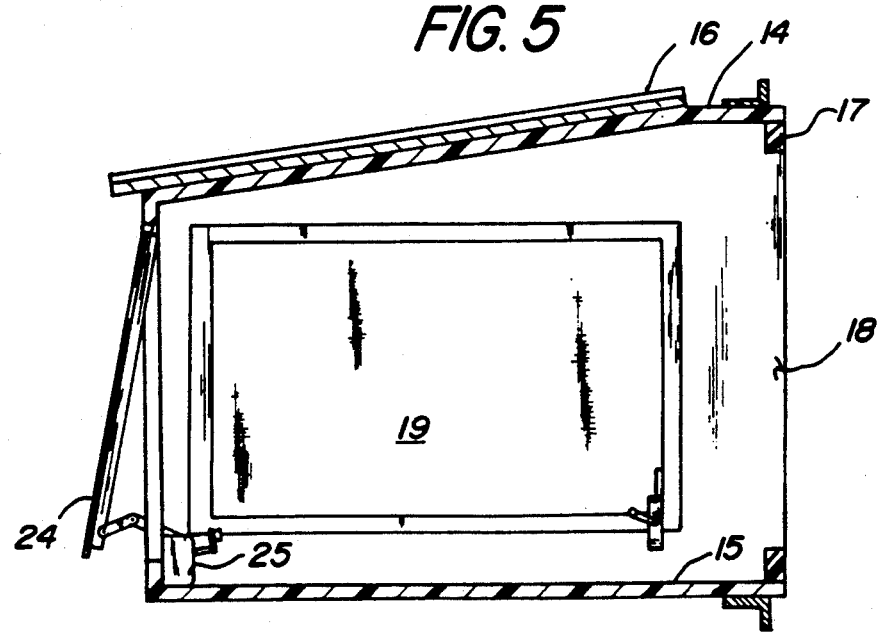
FIG. 5 is an orthographic view, taken along the lines 5—5 of FIG. 4 in the direction indicated by the arrows.

The FIG. 4 exemplifies the use of transparent side wall window plates 23, as well as an end wall window plate 24, mounted pivotally to the end wall 13. The window plates are pivotally mounted over the openings 12a and 13a and are operative through crank mechanisms 25 mounted within the enclosure that include toggle linkages mounted to the crank mechanisms and to the window plates to permit selective opening of the window plates relative to the openings 12a and 13a.

Figure 6:
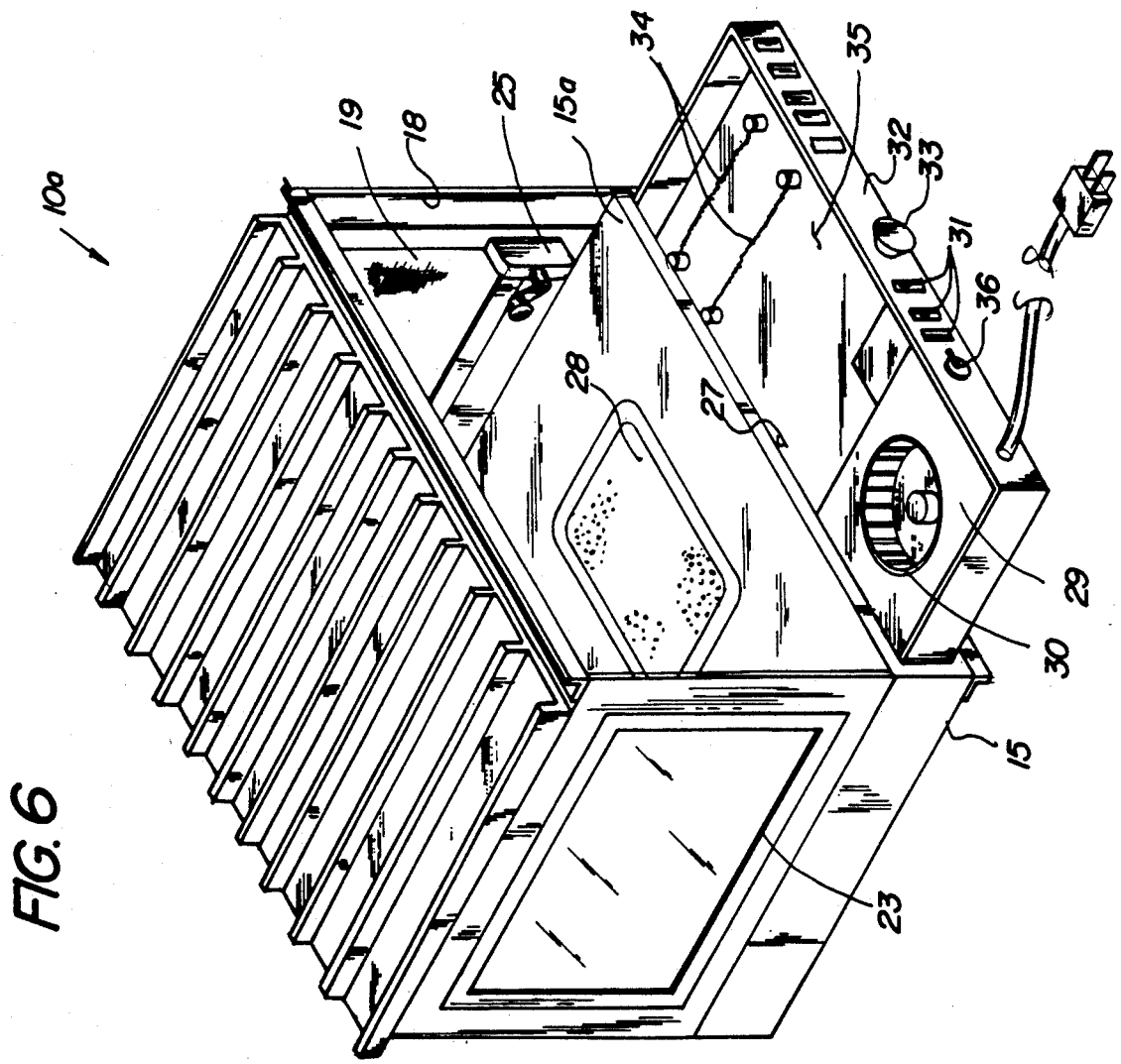
FIG. 6 is an isometric illustration of a modification of the invention.

The FIG. 6 illustrates the apparatus 10a to include an upper floor 15a spaced from the lower floor to slidably receive a slide drawer 26 between the floor 15 and the upper floor 15a defining a floor cavity 27 receiving the slide drawer 26. A perforated plate 28 is mounted through the upper floor 15a positioned above a heating chamber 35 and associated heating assembly. The heating assembly includes a blower motor 39 mounted within the slide drawer to include a fan cage 30 rotatably mounted relative to the blower motor, with fan vents 31 receiving air from interiorly of the dwelling to accommodate air at a higher ambient temperature than outdoor air would be. A slide drawer front wall 32 includes a front wall handle 33 to permit ease of manipulation of the slide drawer relative to the floor cavity. Resistance heating elements 34 are positioned within the heating chamber 35, with an on/off switch 36 mounted to the front wall 32 to effect actuation of the heating elements and the blower motor during use. In this manner, heated air is directed through the perforated floor portion 28 into the enclosure to provide for a comfortable environment for a pet, particularly when the window plates 24 and 23 are directed downwardly about the enclosure. In this manner, a pet may still avail itself of additional sunlight and wherein further, the side plates may be opened partially to moderate temperature within the enclosure as required.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the U.S. is as follows:

1. A window mounted pet enclosure, comprising,
    the enclosure received within a window frame, wherein the window frame includes spaced frame bars receiving the enclosure, wherein the enclosure further includes spaced side walls, each side wall including a side wall opening, and an end wall, the end wall including an end wall opening, and a top wall fixedly mounted to the side walls and the end wall extending beyond the side walls and the end wall, and
    a floor mounted to the side walls and the end wall spaced from the top wall, and
    the top wall including a plurality of parallel ribs mounted coextensively along the top wall for directing rain water between the ribs and for strengthening the top wall, and
    the enclosure further including a front wall, with the top wall canted downwardly from the front wall to the end wall for directing rain water therealong, wherein the side wall openings each include a side wall screen mesh coextensively therewithin, and the end wall opening includes an end wall screen mesh coextensively therewithin, the top wall including a top wall flange extending upwardly of the top wall adjacent the front wall, and the floor including a floor flange extending downwardly from the floor adjacent the front wall, wherein the top wall flange and the floor are arranged for reception through the window frame bars, and the side wall openings each include a side wall transparent window plate pivotally mounted above each side wall opening, and the end wall opening includes an end wall transparent window plate, wherein each window plate includes a toggle hitch and each toggle hitch is mounted to a crank mechanism to effect displacement of the window plates from a first position in contiguous communication with the enclosure and permitting displacement of each window plate to a second position spaced from the enclosure, and the enclosure includes an upper floor spaced above the floor, and a floor cavity is defined between the floor and the upper floor, with a slide drawer slidably mounted within the floor cavity, the slide drawer including a heating chamber within the slide drawer, and a blower motor mounted within the slide drawer adjacent the heating chamber, and the slide drawer including a slide drawer front wall, with a plurality of vents directed through the front wall for directing air through the slide drawer front wall to the blower motor, and a plurality of resistance heating elements mounted within the heating chamber, and a perforated plate mounted within the upper floor, wherein the perforated plate is positioned above the heating chamber to receive heated air from the heating chamber into the enclosure.

* * * * *